Figure 1:
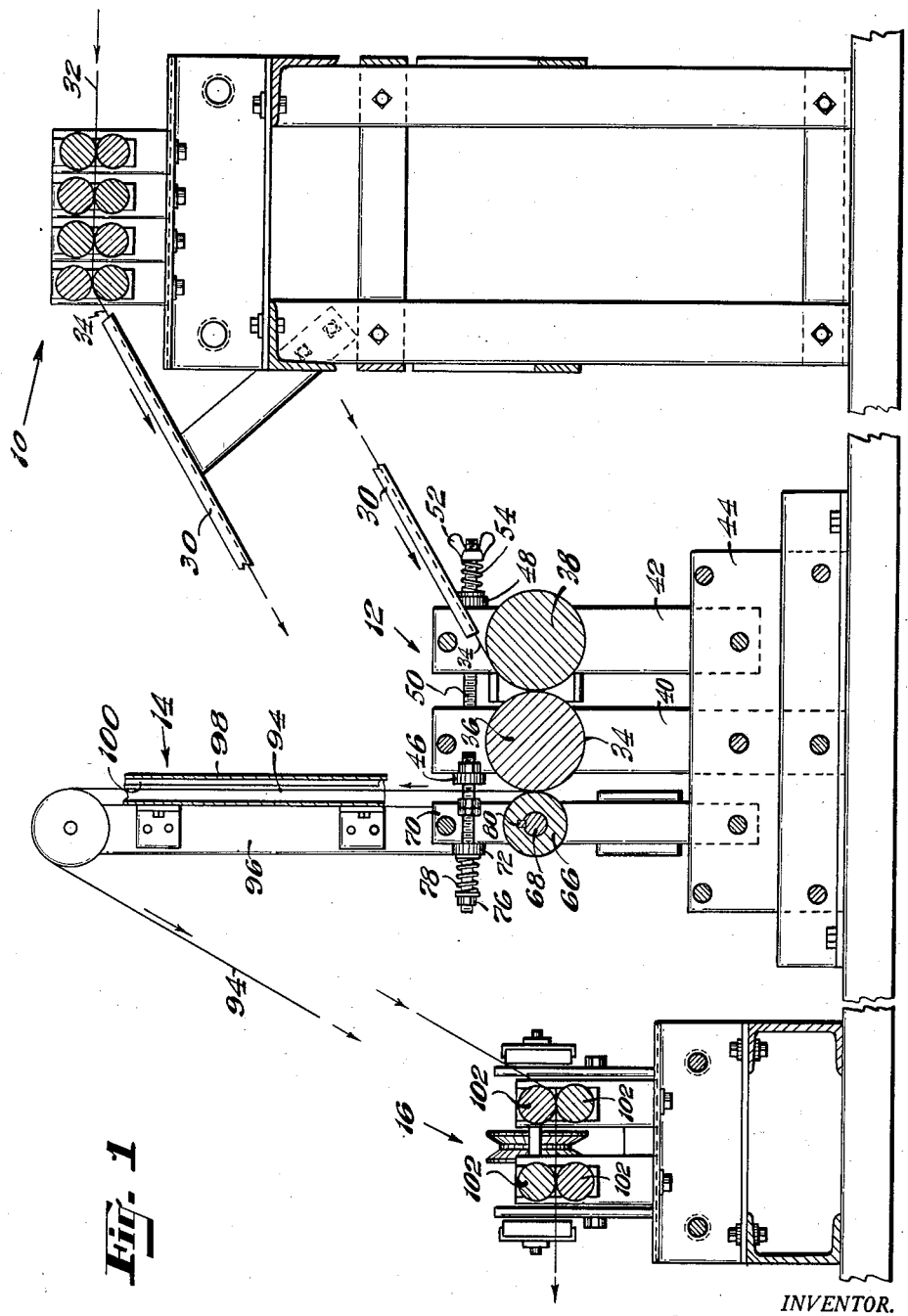

Aug. 21, 1956  B. LAWRENCE  2,759,520
APPARATUS FOR FORMING A TWISTLESS STRAND
Filed March 29, 1952  11 Sheets-Sheet 1

INVENTOR.
Beardsley Lawrence
BY Kenway Jenney Witter
and Hildreth, Attys.

INVENTOR.
Beardsley Lawrence

Aug. 21, 1956  B. LAWRENCE  2,759,520
APPARATUS FOR FORMING A TWISTLESS STRAND
Filed March 29, 1952  11 Sheets-Sheet 6

INVENTOR.
Bradsley Lawrence
BY Kenway, Jenney, Witter
and Hildreth, Attys.

Aug. 21, 1956     B. LAWRENCE     2,759,520
APPARATUS FOR FORMING A TWISTLESS STRAND
Filed March 29, 1952     11 Sheets-Sheet 11

SINGLE ROLL
½" CYCLE LENGTH
1" AMPLITUDE

FIVE ROLLS
2 ½" CYCLE LENGTH
½" AMPLITUDE

COMPLETED PATTERN

INVENTOR.
Bradley Lawrence
BY Kenway, Jenney, Witter
and Hildreth, Attys.

United States Patent Office 2,759,520
Patented Aug. 21, 1956

2,759,520

APPARATUS FOR FORMING A TWISTLESS STRAND

Beardsley Lawrence, Boston, Mass., assignor to Fiberbond Laboratories Inc., Boston, Mass., a corporation of Massachusetts Application March 29, 1952, Serial No. 279,282

10 Claims. (Cl. 154—1.7)

This invention relates to apparatus for producing a filamentary body composed of untwisted staple length fibers in substantially parallel relation overlapping each other and being bonded together by an adhesive. This invention relates more particularly to apparatus for manufacturing the products and carrying out the processes described in my copending application Ser. No. 261,049, filed December 11, 1951, now Patent No. 2,689,813, and is a continuation in part of my copending application Serial No. 151,449, filed March 23, 1950, now abandoned in favor of the present application. In one aspect this invention consists in a novel combination of fiber handling mechanisms.

Among the objects of this invention is the provision of apparatus for thoroughly and uniformly impregnating a continuous series of overlapping staple length fibers with an adhesive, and forming them into an untwisted filamentary body. Another object is to provide apparatus for bonding staple length fibers into a continuous untwisted strand or filamentary body in which individual fibers will be free from initial tension and in which the fibers will be bonded over substantial portions of their length.

Another object of my invention is to provide apparatus for saturating a continuous series of overlapping staple length fibers with an adhesive while the said fibers are in an extremely thin and unmatted state and to gather the fibers so saturated into a continuous untwisted filamentary body.

In the accomplishment of these objects, I draw the fibers of a continuous roving into substantially parallel relation and into an extremely thin dispersed ribbon-like group of fibers by means of a drafting frame. Thereafter I saturate the fibers with liquid adhesive by depositing them onto a roll arranged to rotate in opposed relation to another similar roll, both rolls carrying liquid adhesive on their surfaces and adapted to form a liquid adhesive pool between them. These rolls carry the ribbon-like group of fibers between them and by exerting pressure against them ensure a thorough and a uniform saturation of the fibers, and squeeze out excess adhesive. After passing the bite between the two rolls, the fiber group continues on the surface of one of the rolls where it is engaged by one or more forming rolls which reciprocate axially in light contact with the fibers, and which by gathering the marginal fibers of the fiber group toward the center forms it into a filamentary body without imparting a twist thereto.

In order to permit uniform and thorough fiber saturation, the fibers must be in an extremely dispersed and unmatted condition while being carried on the saturating rolls. In fact, proper saturation requires them to be so disposed that it would be impossible to withdraw them from the wet saturating rolls as a continuous body while in that condition. It is a feature of my invention that the action of the forming roll makes it feasible to gather very thinly dispersed parallel fibers of staple length and separate them from the saturating rolls as a continuous body.

It is a further feature of my invention that in gathering the fibers into a composite body, the forming roll does not impart any substantial initial torsions or tensions to individual fibers within the said body.

An important feature of my invention is that when more than one forming roll is employed, the second roll is controlled relative to the first roll so as to perform its principal forming action upon areas of the ribbon where the first roll performed less forming action.

Additional features of my invention include a second draw frame for eliminating random misalignments in the fibers, additional reciprocating rolls used concurrently with or after drying for purposes of consolidation, and pressure rolls for consolidation.

Figure 2:
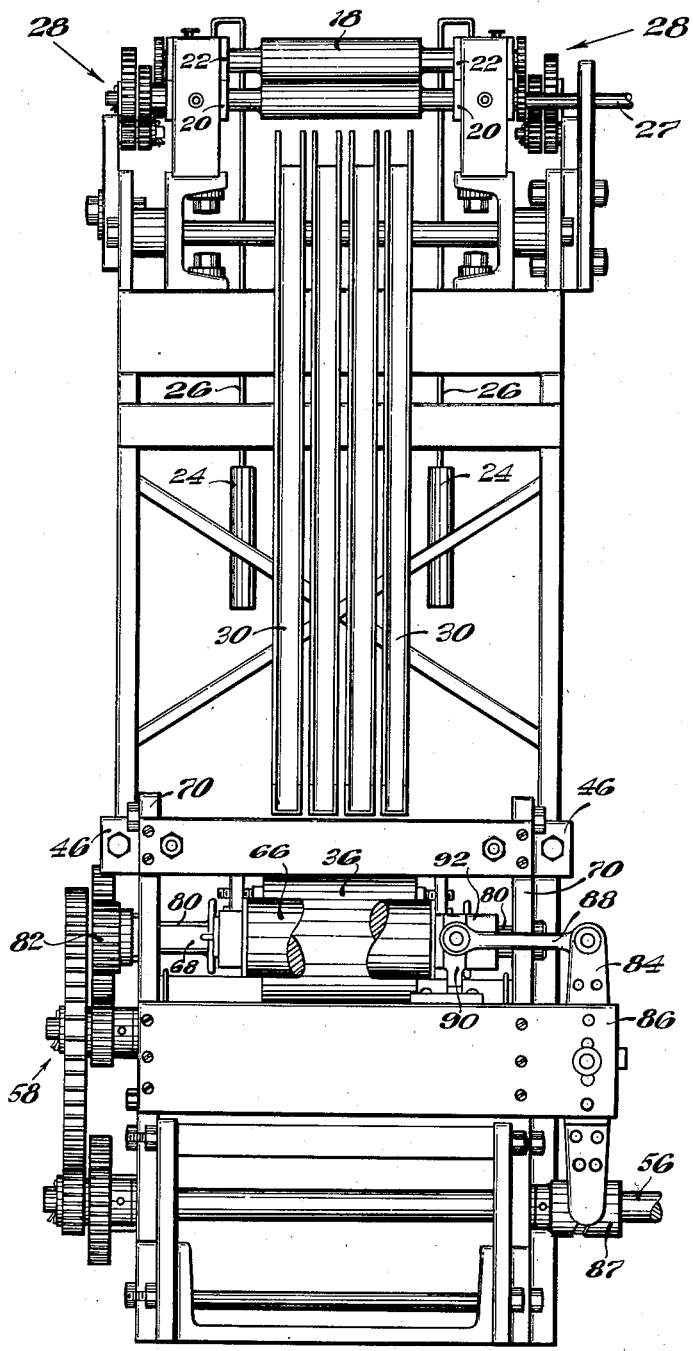
Figure 3:
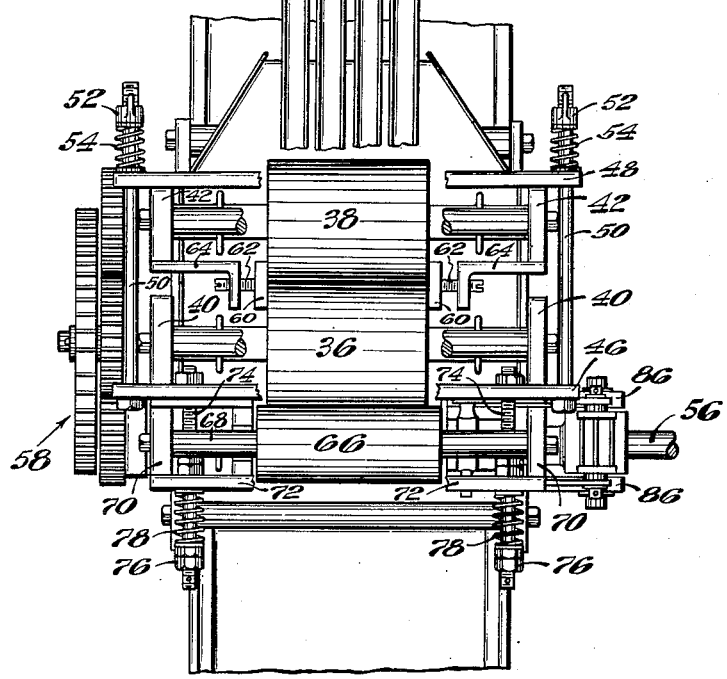
Figure 4:
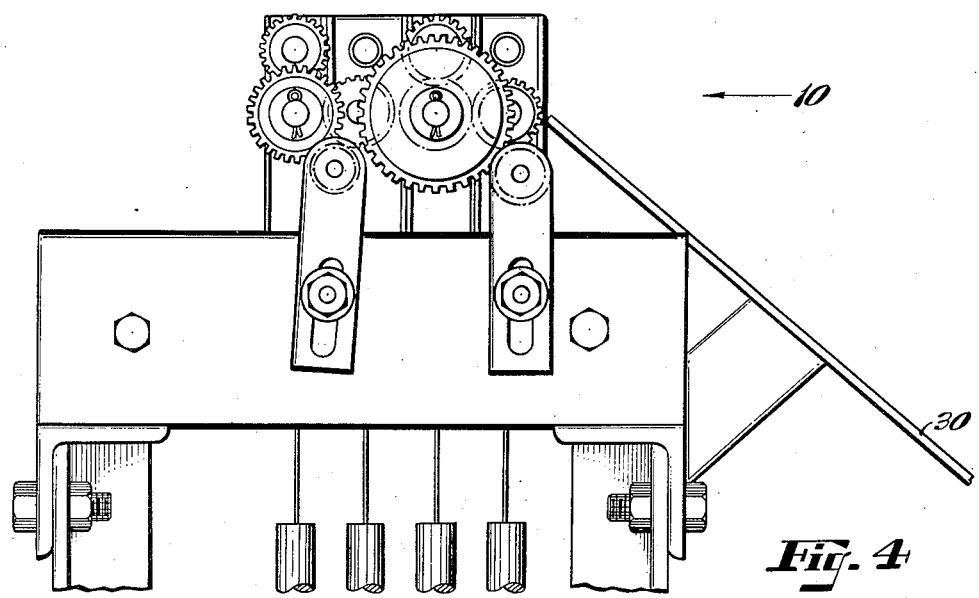

These and other objects and features of my invention will best be understood and appreciated from a detailed description of a preferred embodiment thereof, selected for purposes of illustration and shown in the accompanying drawings in which:

Fig. 1 is a cross sectional view in side elevation from the left showing the draw frame, saturation and forming apparatus, Fig. 2 is a view in front elevation of the draw frame, and saturation and forming apparatus of Fig. 1, Fig. 3 is a plan view of the elements shown in Fig. 2, Fig. 4 is a view in side elevation of the draw frame on the right hand side showing the gear train for driving the drafting rolls.

Figure 5:
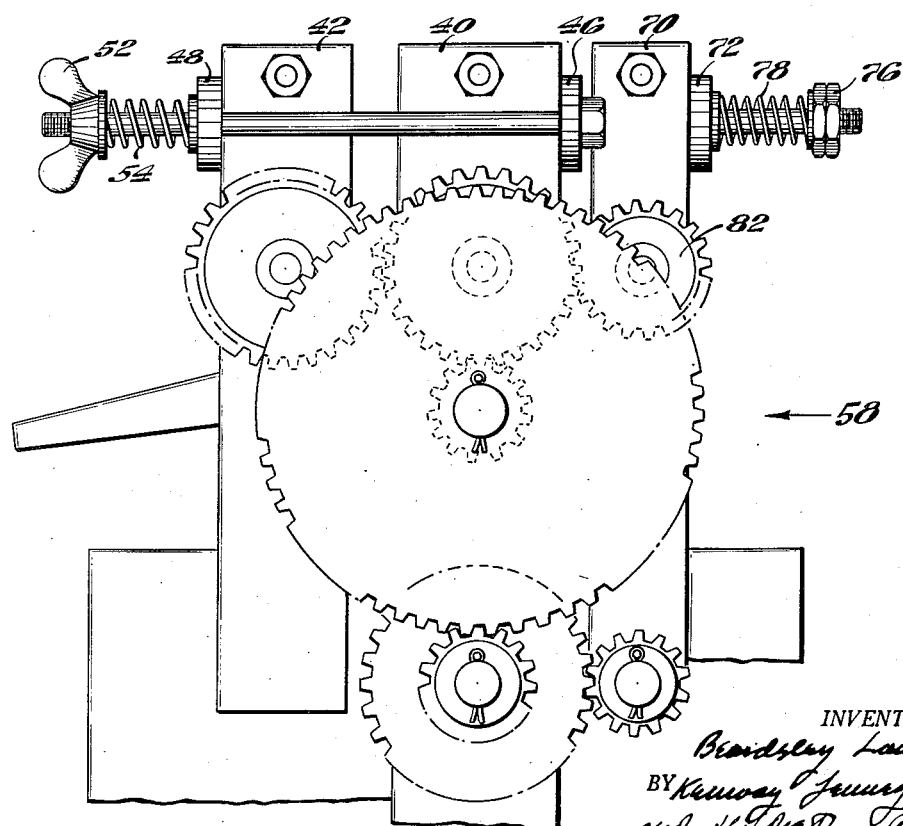
Figure 6:
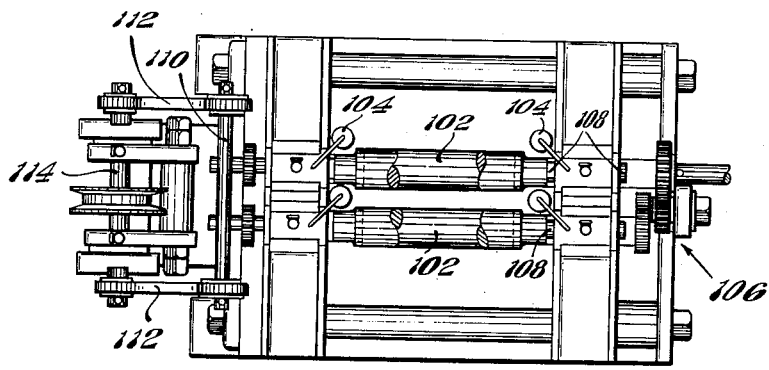
Figure 7:
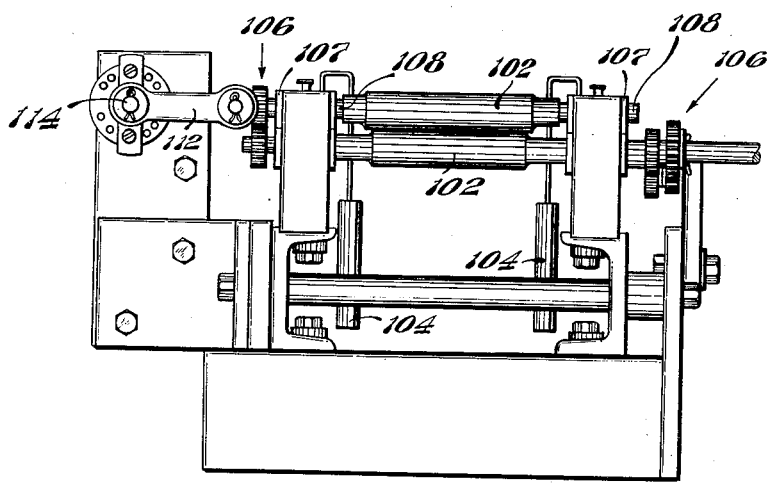
Figure 8:
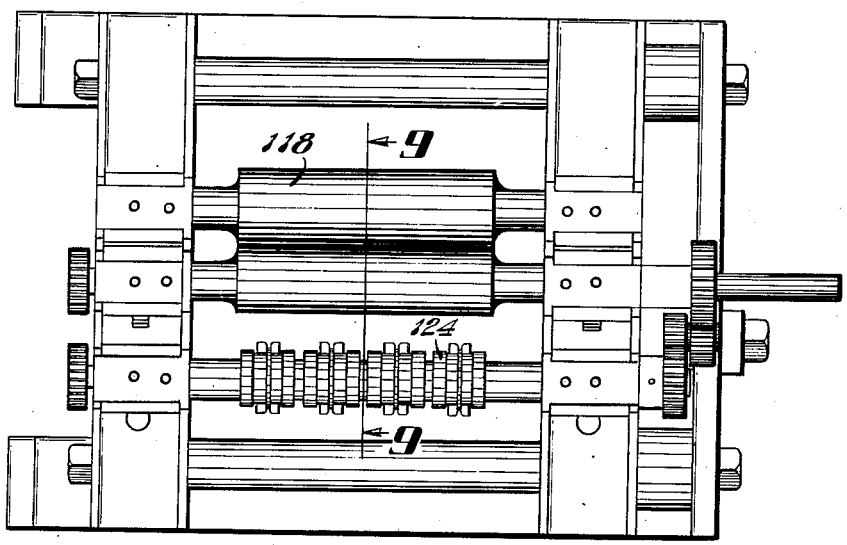
Figure 9:
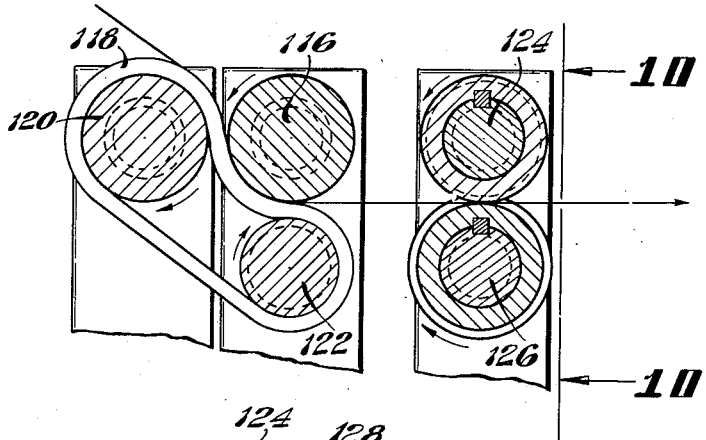
Figure 10:
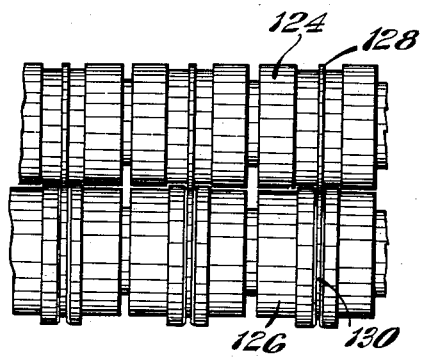
Figure 11:
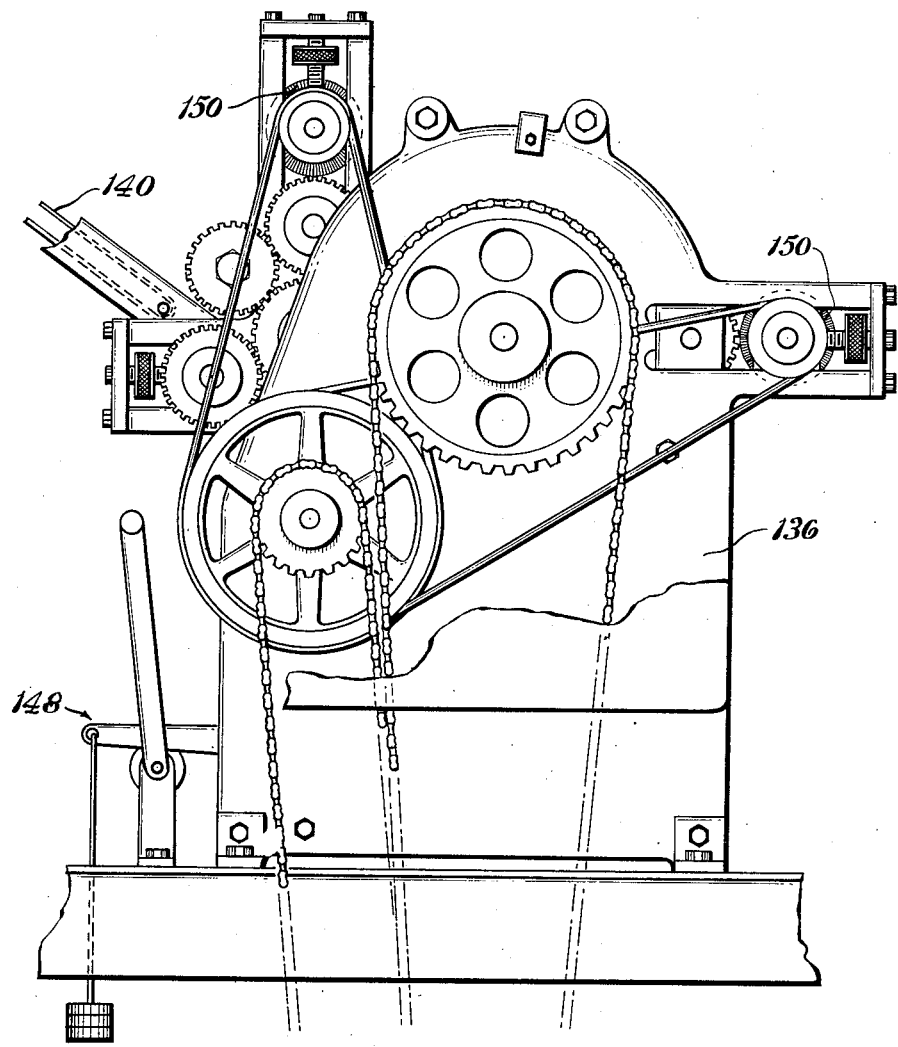
Figure 12:
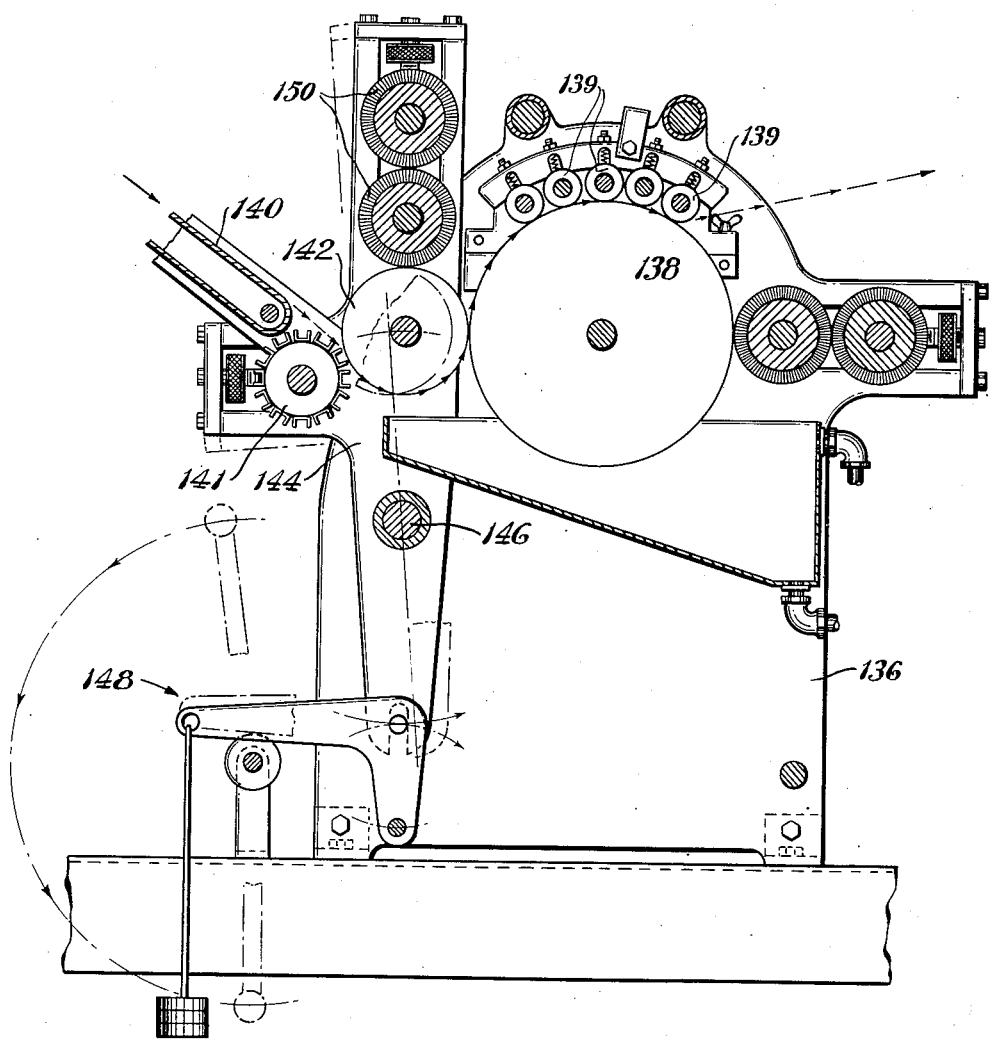
Figure 13:
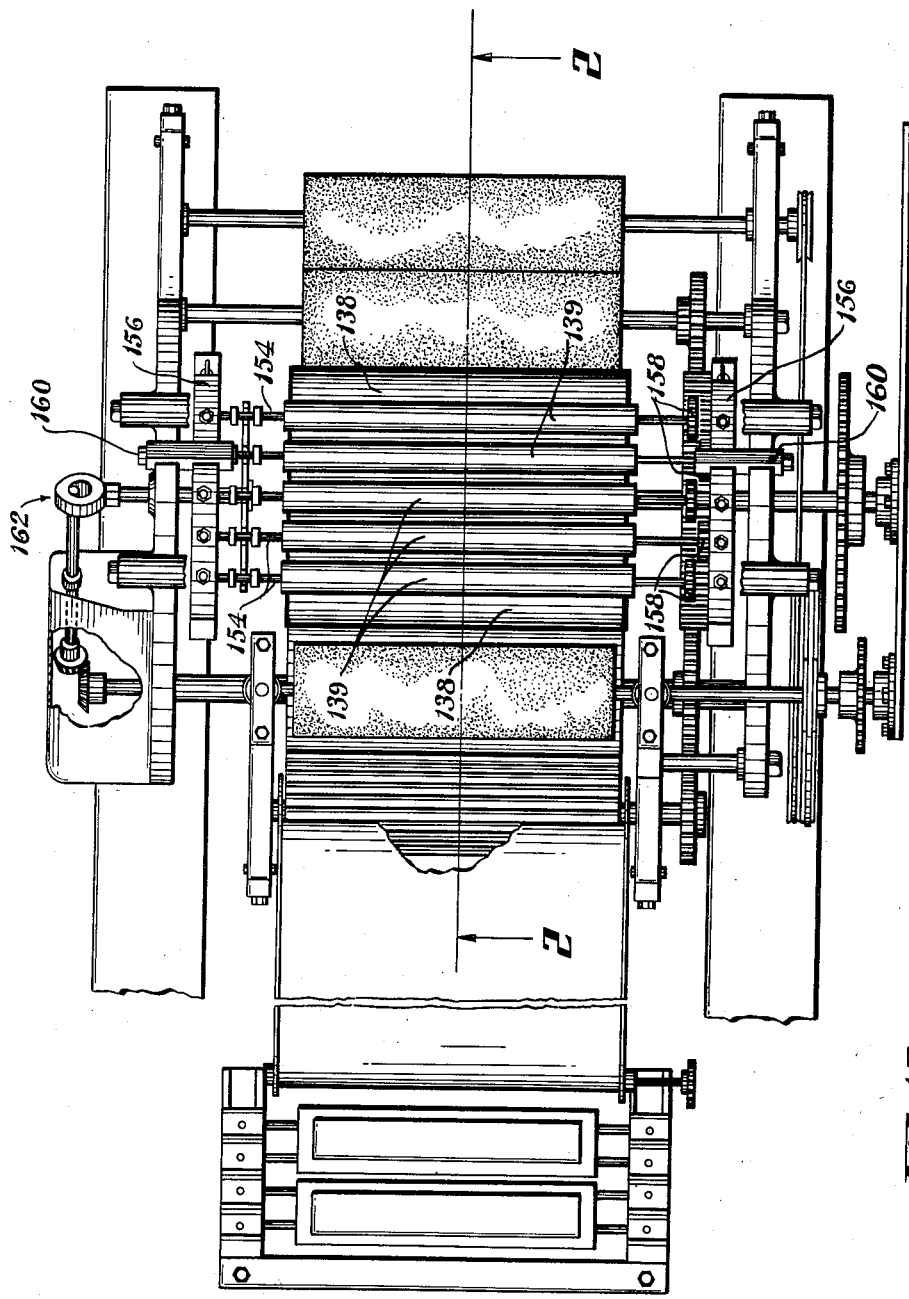
Figure 14:
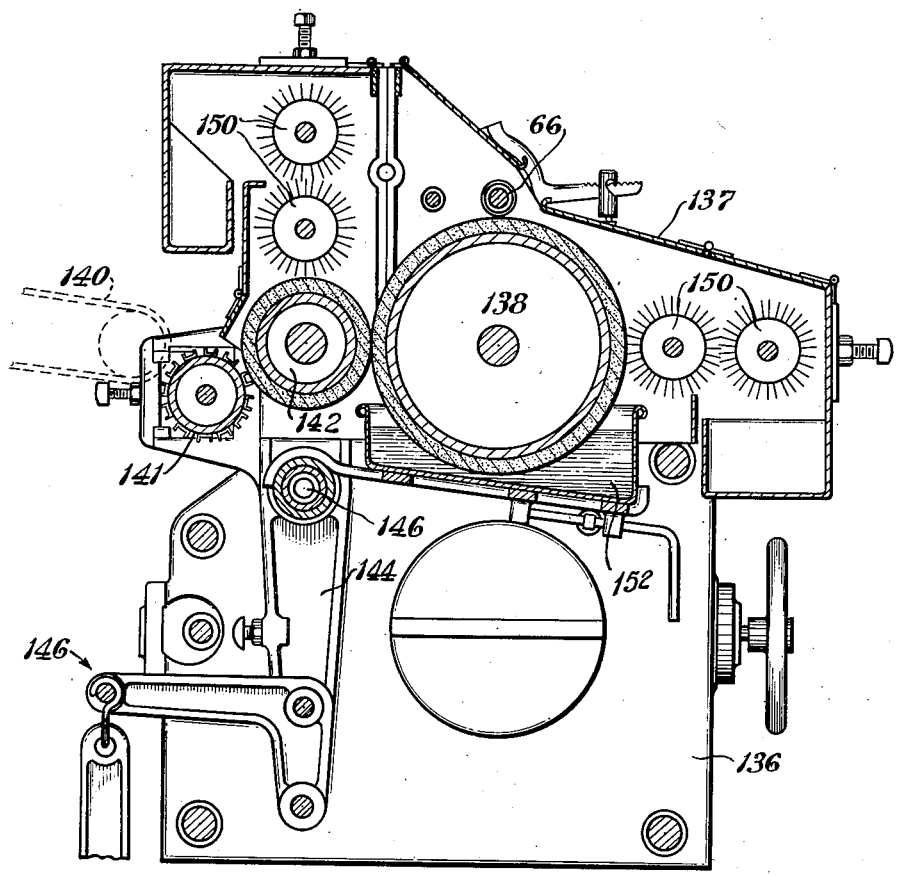
Figure 15:
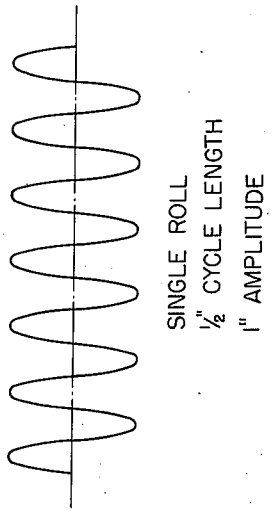
Figure 16:
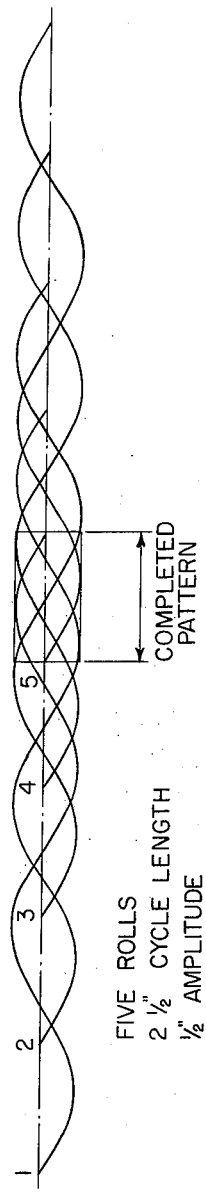

Fig. 5 is a view in side elevation from the right of the saturating and forming apparatus showing the driving gear trains, Fig. 6 is a plan view of the form of consolidation apparatus shown in Fig. 1, Fig. 7 is a view in front elevation of the consolidation apparatus shown in Figs. 1 and 6, Fig. 8 is a plan view of another form of consolidation apparatus, Fig. 9 is a sectional view in side elevation of the consolidation apparatus shown in Fig. 8, Fig. 10 is a view in front elevation of the consolidating rolls of the apparatus shown in Fig. 8, Fig. 11 is a view in side elevation of a multiple forming roll machine, Fig. 12 is a sectional view in side elevation of the multiple forming roll machine, Fig. 13 is a plan view of the saturating and forming elements of a multiple forming roll machine, Fig. 14 is a partially broken away, sectional view in side elevation of a single roll machine adapted with an enclosed housing, Fig. 15 is a graph illustrating the path of a single forming roll, and Fig. 16 is a graph illustrating the path of the five rolls of the apparatus shown in Figs. 11, 12 and 13.

The embodiment of my invention shown in Figs. 1–10 employs a single forming roll and includes in its general organization a draw frame 10, a saturating and forming unit 12, a drier 14, and a consolidating unit 16.

The draw frame 10 is of conventional construction and need not be described in detail. It includes a series of opposed rolls 18 which may be covered by rubber or other suitable material, arranged in pairs with bottom rolls in fixed bearings 20 and top rolls in vertical sliding journals 22. Weights 24 (see Fig. 2) are adapted by means of long rods 26 to bear against journals 22 and cause the upper rolls to press firmly against the lower rolls.

The rolls 18 are driven in rotation by a source of power not shown, communicating through shaft 27 with a conventional gear arrangement indicated generally at 28, and are adapted for a draft ratio of 6-1. Thus, a roving 32 enters at the right hand side as viewed in Fig. 1 and is drafted into a flat, thinly dispersed ribbon-like body 34 of only a few fibers thickness. In this condition, the fibers cannot be picked up or handled because they do not have enough strength as a composite body even to support their own weight. However, they are sufficiently strong to remain together while passing down smooth chutes 30 to the saturating and forming unit 12.

It will be understood also that numerous conventional draw frame arrangements may be employed in supplying the drawn ribbon 34 to the chutes 30, and that other means for conveying the said ribbon to the saturating and forming unit 12 are feasible. For instance, a conveyor belt could be employed, and, in some applications where the ribbon is extremely thin, would even be preferable. Also, of course, draft ratios may readily be varried to suit requirements.

The saturating and forming unit 12 includes a front saturating roll 36 and a rear saturating roll 38, mounted for rotation in opposed relation in suitable bearings (not shown) in upright lateral pairs of stanchions 40 and 42 respectively, which are in turn mounted on a frame 44. Since the rolls 36 and 38 press against each other one of them may be referred to as a pressure roll and the other a saturating roll to distinguish them from one another. Stanchions 40 are rigidly secured to frame 44, but stanchions 42 are pivotally mounted to carry roll 38 toward or away from roll 36. Cross braces 46 and 48 are welded to stanchions 40 and 42 respectively above the level of the rolls and provide transverse support for their associated pairs of stanchions. The cross braces also serve to mount adjusting rods 50 bolted at one end to cross brace 46 and passing through perforations in cross brace 48. Set screws 52 and springs 54 serve to pivot stanchions 42 forward and thereby to urge roll 38 against roll 36, as well as provide means for regulating the pressure between the said rolls.

The saturating rolls 36 and 38 in this embodiment are of equal diameter and are driven in opposite directions by a suitable source of power (not shown) communicating through shaft 56 and driving a gear arrangement indicated generally at 58. The power source for the saturating rolls may preferably be in geared or chain driving relationship to the source of power for the draw frame 10 because rolls 36 and 38 preferably should maintain a peripheral velocity directly proportional to the velocity of the ribbon as it exists from the draw frame. In this embodiment the peripheral velocity of the saturating rolls is 2% greater than the speed of the fiber as it emerges from the draw frame. This serves to maintain the fibers straight and parallel.

Adhesive in liquid form is applied to the rolls 36 and 38 by forming a small pool directly above the bite between the rolls. For this purpose, dams 60 are mounted adjacent the rolls on each side at and above the bite between the rolls, being adjustably supported by set screws 62, which are in turn mounted in angle irons 64 welded to each stanchion 42.

As a ribbon 34 descends from a chute 30, it drops onto roll 38 and is carried down through the pool of adhesive to the bite between the rolls. At this point excess adhesive is squeezed from the fibers and they issue below the bite in a thoroughly and uniformly saturated state. It will be understood that the term "saturation" as employed herein does not refer to penetration or absorption into the interior of individual fibers (although no doubt some absorption does take place) but rather refers to distribution of adhesive among the fibers, and upon their surfaces.

Although the ribbon 34 is extremely weak, the moist surfaces of the rolls 36 and 38 tend to support it and in this condition it may be transferred from roll 38 to roll 36 at it passes below the bite between the said rolls. This is done by merely leading the ribbon onto roll 36 when operations commence, and, when once started, ribbon 34 simply continues to transfer onto roll 36.

Ribbon 34 remains on roll 36 for approximately one half a revolution whereupon it is gathered and formed into a compact strand-like body by an axially reciprocating forming roll 66. Roll 66 includes a metal cylinder mounted parallel to roll 36 to slide axially along a shaft 68 which is mounted for rotation in bearings in suitable lateral supporting stanchions 70. Stanchions 70 are provided with a cross brace 72 and are mounted to rock towards stanchions 40 in a manner similar to the mounting of stanchions 42. Rods 74, set screws 76 and springs 78 likewise serve to adjust the position of stanchions 70 and thereby the position of the forming roll 66. The shaft 68 is provided with an axial key 80 and roll 66 with a corresponding keyway for driving the roll 66 in rotation with shaft 68 but yet to permit it to slide axially.

Shaft 68 is driven in rotation by a gear 82 which intermeshes with one of the gears for driving the saturating roll indicated at 58, and is adapted to rotate the forming roll 66 at the same peripheral speed as the saturating rolls.

Roll 66 is reciprocated axially by a rocker arm 84 pivotally mounted between a pair of braces 86 above power shaft 56. The lower end of the rocker arm 84 engages, and is reciprocated by a double walled cam 87 mounted on shaft 56. The upper end of rocker arm 84 is pivotally connected to two drive arms 88, which in turn connect to a thrust bearing slip ring 90 mounted in hub 92 of the roll 66. Thus, rocker arm 84 reciprocates moving the roll 66 axially while it is simultaneously being rotated in unison with saturating roll 36. As the ribbon 34 comes into contact with the forming roll 66, it is gathered together and/or rolled up by the reciprocal rubbing action of roll 66. To promote this rubbing action, roll 36 may be provided with a roughened rubber surface, and the forming roll 66 may be covered with cork. Also, the pressure of roll 66 against roll 36 must be carefully controlled because too much pressure separates the ribbon into numerous small strands and too little pressure fails sufficiently to form the strand to separate it from the saturating roll. Another factor of control is the length of stroke of roll 66. It may be varied as desired to accommodate various ribbon widths by changing the pivot point of rocker arms 84 on bracket 86.

The ribbon 34 is transformed into a twistless strand 94 by the forming roll 66. This strand 94 comprises essentially straight staple length fibers aligned in substantially parallel relation bonded together by an adhesive and being free from initial tensions or torsions. The adhesive mixture employed may include a high percentage of water which will eventually evaporate and leave substantial gaps or interstices between the fibers. Such gaps are undesirable where strength of the yarn is an object and therefore the strand 94 is led through a drying unit 14 and thereafter consolidated.

The drying unit is mounted on a stand 96 and includes a vertically disposed flat box 98 positioned directly over the bite between roll 66 and 36 with its top and bottom ends open. A heating coil indicated diagrammatically at 100 lines the inside of box 98 and strand 94 is led upward past the coil 100 but not actually in contact with it. Air is free to circulate upward through box 98 and thereby promote drying. It will be understood that other types of conventional driers may be employed and that the length of time in the drier and temperatures etc. may be varied to suit the characteristics of the adhesive, the size and type of yarn, etc. Furthermore, if thermal setting resins are employed, drying in itself may be no object, but heat may be the important factor.

The amount of adhesive picked up by the ribbon 34 may be regulated by varying the pressure between rolls 36 and 38, or by changing the concentration of solids in the liquid adhesive mixture.

Consolidation may be accomplished in several ways, two of which are herein shown. The first is illustrated in Figs. 1 (at the left), 6 and 7, and includes two sets of opposed rolls 102 mounted in pairs for rotation in vertical journals and bearings similar to the rolls of the draw frame 10. Weights 104 serve to urge the upper rolls down against the lower rolls. Rolls 102 are driven in rotation by a suitable gear arrangement indicated generally at 106, and are maintained at the same or slightly greater peripheral speed as the rolls 36 and 66 by chain or geared drive connection to the general source of power. The upper set of rolls 102 are adapted for axial reciprocation by providing sliding bearings 107 for their shafts 108, and actuating their shafts 108 axially by means of a frame 110 connected to shafts 108 by double thrust bearings and reciprocating the frame 110 by connecting rods 112 which are mounted eccentrically on a shaft 114 and are driven reciprocally thereby. The second pair of rolls 102 in the order of progression of the strand 94 may be driven slightly faster than the first pair to subject the strand to a slight draft at the same time as compressing or consolidating it. In order to maintain a more positive grip on strand 94 without exerting excessive pressure on it, rolls 102 may be covered with cork filled neoprene, but it will be understood that varying adhesive and strand conditions may require other roll surface conditions.

Another consolidating unit is illustrated in Figs. 8–10, and includes a series of rolls mounted in a frame generally similar to that shown in Figs. 6 and 7. In this embodiment, however, the strand 94 is engaged first between an upper roll 116 and an endless belt 118 mounted upon rolls 120 and 122 and bearing against roll 116 through 90° of arc, and then between opposed pressure rolls 124 and 126 which are provided with interfitting peripheral lands 128 and grooves 130 respectively. Rolls 116, 120, 122, 124 and 126 are driven in unison by a conventional gear train with rolls 124 and 126 at greater peripheral velocity in order to subject the strand to a tension or draft during consolidation. The endless belt 118 serves to provide sufficient traction on the strand 94 to permit the drafting effect of rolls 124 and 126 to take place but yet not to consolidate the strand to such a degree that drafting will be impossible. Lands 128 and grooves 130 may be varied in size and contour to accommodate various sized strands. Also in order to lessen the risks of crushing the fibers in the grooves 130, a rubber or neoprene bottom may be provided for the said grooves.

Another embodiment of my invention employs more than one forming roll and is shown in Figs. 11, 12 and 13. However, before describing this embodiment in detail, it is considered that a brief theoretical discussion of the forming action will best serve the needs of clarity.

The principal thing to bear in mind when discussing the theoretical aspects of this invention is that it is extremely difficult to describe what takes place in the process of forming a flat ribbon of parallel fibers into a round and continuous twistless strand by the action of a forming roll. The observer only sees the flat ribbon going into the rolls and the rounded uniform strand coming out. Just exactly what the forming rolls do is not apparent to the eye.

On the other hand there are certain things that we do know. For instance, it is obvious that there is a definite relationship between the rate and amplitude of reciprocation of the forming roll and the speed of the ribbon. If the ribbon stood still, forming action would occur only on one spot; whereas if the ribbon went at an infinite velocity, theoretically no forming action would take place at all. In between these extremes we know that a forming action takes place in a more or less degree. The slower the ribbon moves the more perfect will be the forming action for a given rate and amplitude of reciprocation. On the other hand, practical considerations require that the yarn move forward at a fair rate of speed and that the forming roll reciprocate at a speed consistent with mechanical limitations.

In the embodiment of my invention described in Figs. 1–10, the mechanism for controlling the forming roll was designed to make a complete cycle of reciprocation for each ½" of ribbon advance. The action of this roll is plotted graphically in Fig. 15 where it will be seen that the forming roll follows a conventional sine curve. The curve represented in Fig. 15, as well as the curves of the graph shown in Fig. 16 depicting the multiple forming roll embodiment to be described presently, are generated by the point of tangency of a single circumferential line on the forming roll as it moves back and forth on the surface of the saturating roll. It will be understood, of course, that the yarn itself between the forming roll and the saturating roll may not travel at the same reciprocal speed as the forming roll due to variations in diameter of yarns, surface conditions of the rolls, differences in viscosity of adhesive, etc. These graphs merely represent the empirical motion of the forming roll alone.

It will be seen from the graph shown in Fig. 15 that, as the forming roll reverses its direction, there is a short period during which the ribbon receives very little forming action. This may be referred to for convenience as a dead space. Actually, on a single roll machine as described in Figs. 1–10 and 14 with a ½" cycle length and a 1" amplitude, the ribbon is formed into a staisfactory yarn. This is because the ribbon travels sufficiently slowly, and also because the dead space in the reciprocation of the forming roll is not so great as to cause any substantial widening or flat spot to appear in the yarn. The forming roll not only gathers together the fibers which are immediately in contact with it, but also tends to pull together the fibers for a short distance ahead and behind on the ribbon. Thus when the forming roll passes through the dead space in its reciprocation, no marked detriment is experienced provided the ribbon travels slowly enough.

One way to improve the action of the forming roll is to adapt it for reciprocation in accordance with a saw tooth wave formation, or to modify the sine wave formation to lessen the dead space in reciprocation. These modifications are considered to come within the scope of this invention.

Also great improvement in speed as well as substantial improvement in forming action can be attained by employing more than one forming roll and controlling the reciprocation so that the dead space in the reciprocation of each succeeeding roll meets the yarn at a different place from that of the preceding rolls.

The embodiment of my invention shown in Figs. 11, 12, and 13 is a multiple forming roll machine and includes in its general organization a main frame 136, a saturating roll 138, forming rolls 139, belt mechanism 140 for transferring the fiber ribbon into the machine, a feed roll 141, and a pressure roll 142 adapted to press the ribbon against the saturating roll 138. Mechanism for regulating the pressure of roll 142 against saturating roll 138 is provided by mounting the roll 142 in a pivotal frame 144. The said frame 144 is pivotally connected to the frame 136 by a horizontal shaft 146. The lower end of the frame 144 is pivoted by means of a lever and weight arrangement indicated generally at 148. Brushes 150 are mounted appropriately for the purpose of cleaning the surface of the pressure roll 142 and the saturating roll 138 without interferring with the path of the ribbon. It will be understood, of course, that the saturating roll 138, the forming rolls 139, the feed belt 140, the feed roll 141, the pressure roll 142 and the brushes 150 are all driven in geared relationship one to the other by conventional mechanism shown generally in Fig. 11.

A prominent feature of this embodiment of my invention is the multiple forming roll arrangement. As shown, I have employed five forming rolls 139 mounted on parallel shafts 154 which are adapted at each end to rotate in bearing blocks 156. Each shaft 154 is provided with a drive gear 158 for turning each respective forming roll 139 at a peripheral velocity equal to the peripheral velocity of the saturating roll 138. The bearing blocks 156 are slidable laterally and carry the shafts 154 and forming rolls 139 in lateral reciprocation. The said blocks 156 are retained in alignment by means of sliding elements 160 which are keyed to slide laterally through appropriately machined slide openings in the main frame 136. At one side, a cam arrangement indicated generally at 162 is provided for imparting the desired reciprocal motion to the forming rolls 139. The bearing blocks 156 are further provided with suitable adjustment mechanism for insuring a light contact between the forming rolls 139 and the fiber ribbon which lies on the surface of the saturating roll 138.

Other general details of the multiple forming roll embodiment of my invention need not be more specifically described, it being understood, of course, that the lower portion of the saturating roll 138 rotates through a bath 152 of adhesive. Also the frame 136 may be extended to cover the saturating roll for the purpose of controlling atmospheric conditions surrounding the said roll. In Fig. 14 I show a single roll machine with saturating elements enclosed by a cover 137. Of course, such an arrangement may be employed with the multiple roll embodiment.

In the embodiment shown in Figs. 11–13, I am able to employ a much smaller amplitude than in the embodiment shown in Figs. 1–10 and I am further permitted to increase the cycle length. I have found in this construction that the amplitude may be reduced to ½" and the cycle may be increased to 2½". When this is done in a five forming roll machine with the forming rolls 139 spaced 1" apart, a reciprocation diagram as illustrated in Fig. 16 will result. The area in Fig. 16 enclosed in the rectangle illustrates a completed pattern of the forming rolls 139 and shows that for every portion of the length of the ribbon, it will have been subjected to the action of at least one forming roll in the most effective period of the cycle of such roll. This arrangement has permitted me to speed up the rate of ribbon advance in a very marked manner. Successful forming action has been carried out with the ribbon traveling at a rate of 50 yards per minute, and it is clear that even greater velocity can be obtained following the teaching of this invention.

While it is within the purview of this invention to use a symmetrical pattern as described in Fig. 16, it will be understood that the cycle of the forming rolls need not be arranged in this precisely balanced manner. The essential thing with regard to this aspect of my invention is that a plurality of rolls be used and the succeeding rolls be adapted to act upon the ribbon or partially gathered yarn in the areas where the preceding rolls acted less. In other words with a multiple forming roll machine no single roll is required to complete the forming job, but may partially form the ribbon as it advances, and succeeding rolls will then complete the forming action by being adapted to act on areas of the ribbon which were not completely formed by the previous rolls. Thus the dead space in the reciprocation of a single roll may leave only a small area of the yarn incompletely formed, and thereafter it will not be necessary to have the succeeding forming roll act upon the yarn precisely to place the unformed spot in the center of the cycle of the second roll because other portions of the cycle outside of the dead space will be sufficient to complete the forming of that one unformed spot.

While the forming rolls 139 as herein shown all reciprocate the same and have the same cycle length, it will be understood that the amplitude of reciprocation need not be the same for each roll. In practice, however, it is more convenient mechanically to arrange them as described herein. Furthermore the cycle length of one forming roll need not be the exact same cycle length as the other forming roll provided that the dead space of the second roll does not coincide on the ribbon with the dead space of the first roll. In other words if the cycle lengths of the various rolls are not the same, they should be multiples of the smallest cycle length.

By the foregoing analysis I do not intend to preclude the using of more than one forming roll with exactly repetitious patterns. In some circumstances such an arrangement will be highly advantageous in providing a more compact yarn.

While I have devoted particular attention in this description to the apparatus for producing the bonded yarn of my invention, it will be seen that the multiple forming action of the embodiment shown in Figs. 11–13, may likewise be expressed in terms of a method. In other words, forming the yarn at least in part at a plurality of stations which combine completely to form the yarn may be accomplished by mechanism other than that specifically described herein. Therefore I intend to claim herein the method which includes a plurality of cooperating forming stations.

Certain variations are contemplated as coming within the scope of this invention. For instance it is not necessary to reciprocate only the forming roll 66, or forming rolls 139. The saturating rolls may be reciprocated if desired, it being understood that relative motion between the two surfaces is what is required. Numerous other variations of this preferred embodiment of my invention will be apparent to those skilled in the art, and therefore it is not intended to confine the invention to the precise form herein shown but rather to measure it in terms of the appended claims.

Having thus described a preferred embodiment of my invention, what I claim as new and desire to secure by Letters Patent is:

1. Apparatus for manufacturing a twistless, staple length fiber strand comprising a draw frame, a saturating roll, means for transferring a drafted ribbon from said draw frame to said saturating roll without subjecting said ribbon to substantial tension, a pressure roll, mechanism adapted to squeeze said ribbon between said pressure roll and said saturating roll whereby to prepare said ribbon for forming and to regulate the amount of adhesive picked up by the ribbon; a first forming roll, mechanism for reciprocating said first forming roll, said first forming roll being positioned in light contact with said ribbon, and acting on said ribbon at least partially to gather the fibers thereof at spaced intervals along the length of said ribbon; a second forming roll, mechanism for reciprocating said second forming roll at the same rate of reciprocation as that of said first forming roll; and said second forming roll being located relative to said first forming roll so as to effect a gathering action on the fibers of said ribbon primarily in areas of said ribbon upon which said first forming roll performed the least gathering action.

2. Apparatus for producing a twistless filamentary body having in combination a draw frame adapted to draft a roving into a thin dispersed ribbon, means for saturating said ribbon with an adhesive, and mechanism for thereafter forming said ribbon into a continuous twistless filamentary body including a plurality of forming rolls mounted for axial reciprocal relative motion in light contact with said ribbon and each said roll adapted at least partially to form said ribbon.

3. The apparatus for producing a twistless filamentary body defined in claim 2 further characterized by mechanism for preparing the ribbon for formation and for controlling the amount of adhesive picked up by the ribbon including a pressure roll mounted adjacent to said ribbon, and means adapted to press said pressure roll against said ribbon.

4. The apparatus for producing a twistless filamentary body defined in claim 2 further characterized by each of said forming rolls adapted to gather said ribbon at least partially into a composite filamentary body and to cooperate one with the other to effect a complete gathering of said ribbon as it passes the last said forming roll.

5. Apparatus for forming a twistless strand comprising in sequence, means for drafting staple length fibers into a thinly dispersed, flat ribbon; means including a moving surface having adhesive thereon for saturating said ribbon with adhesive; means for gathering said ribbon into a strand without twisting the same including a first and second forming roll in contact with said ribbon and means for reciprocating both said forming rolls transversely of said ribbon; and mechanism for coordinating the motion of said surface and said first forming roll so that, as said ribbon is carried forward by said surface, said first roll operates primarily on uniformly spaced portions along the length of said ribbon; and mechanism for coordinating the motion of said second forming roll with the motions of said surface and said first forming roll so that said second roll operates primarily on other portions of said ribbon spaced apart by the same distance as said first-mentioned portions.

6. Apparatus for forming a twistless strand from a thin flat ribbon of substantially parallel staple length fibers, said fibers being saturated with an adhesive and being carried longitudinally of said apparatus by a moving saturating surface, said apparatus having in combination, a first forming roll, mechanism for reciprocating said first roll in light contact with said ribbon whereby, as the ribbon progresses, said first forming roll gathers together the fibers of some portions of said ribbon while leaving other portions thereof substantially ungathered, a second forming roll, mechanism for reciprocating said second roll in light contact with said ribbon after it has passed said first roll, and means controlling the action of both of said reciprocating mechanisms in a fixed relationship to the longitudinal motion of said ribbon to cause said second roll to perform its gathering action on the said substantially ungathered portions of said ribbon.

7. Apparatus for forming a twistless strand comprising in sequence, means for drafting staple length fibers into a thinly dispersed flat ribbon, means including a moving surface having liquid adhesive thereon for receiving said ribbon, means including a pressure roll for squeezing excessive adhesive from said ribbon, for removing excessive adhesive from said surface adjacent to said ribbon and for preparing said ribbon for later formation into a twistless strand by flattening said ribbon against said surface and leaving said ribbon in a condition of viscous adhesion to said surface, said pressure roll being mounted to rotate in contact with and in unison with said moving surface, means limiting said pressure roll against motion in either direction longitudinally of its axis relative to said moving surface and means for thereafter forming said ribbon into a strand including a forming roll in light contact with said ribbon and mechanism for reciprocating said forming roll transversely of said ribbon.

8. Apparatus for producing a twistless filamentary body as defined in claim 7 further characterized by including in its combination means for consolidating said body after it has passed said forming roll comprising a frame, opposed pairs of rolls mounted for rotation within said frame, means for reciprocating said rolls axially relative to each other, means for simultaneously rotating said rolls in unison by pairs, and means for rotating the pairs of rolls progressively faster from pair to pair along said frame, whereby said strand may be consolidated by the axial reciprocal rolling of said rolls and simultaneously drafted.

9. Apparatus for producing a twistless filamentary body as defined in claim 7 further characterized by including in its combination means for consolidating said body after it has passed said forming roll comprising a frame, a pair of spaced parallel rolls mounted for rotation within said frame, an endless belt mounted on said pair of spaced rolls, a single roll mounted for rotation parallel to said spaced rolls and in opposed relation to said endless belt over a substantial arc, means for actuating said belt and single roll in unison, a pair of rotatable pressure rolls mounted in opposed relation within said frame, peripheral grooves on one pressure roll, peripheral lands on the other pressure roll entering the said grooves, and means for rotating the pressure rolls in unison at a peripheral speed in excess of the peripheral speed of the endless belt, whereby the endless belt may be employed to grip the strand without excessively consolidating it while the pressure rolls may be employed both to draft and consolidate the strand.

10. Apparatus for producing a twistless filamentary body as defined in claim 7 further characterized by means for reciprocating said forming roll in accordance with a saw toothed reciprocation wave formation.

References Cited in the file of this patent

UNITED STATES PATENTS

| | | |
|---|---|---|
| 523,640 | Kay | July 24, 1894 |
| 1,610,776 | Hardman | Dec. 14, 1926 |
| 1,877,488 | Allen | Sept. 13, 1932 |
| 2,456,923 | Cogovan | Dec. 21, 1948 |
| 2,476,298 | Heizer | July 19, 1949 |
| 2,572,407 | Talet | Oct. 23, 1951 |
| 2,689,813 | Lawrence | Sept. 21, 1954 |